(12) United States Patent
Schnur et al.

(10) Patent No.: US 10,954,788 B2
(45) Date of Patent: Mar. 23, 2021

(54) HEAT ENGINE, IN PARTICULAR ORC ENGINE

(71) Applicant: DEVETEC GMBH, St. Ingbert (DE)

(72) Inventors: Rainer Schnur, Morscholz (DE); Joscha Horbach, Konken (DE)

(73) Assignee: DEVETEC GMBH, St. Ingbert (DE)

( * ) Notice: Subject to any disclaimer, the term of this patent is extended or adjusted under 35 U.S.C. 154(b) by 59 days.

(21) Appl. No.: 15/998,542

(22) PCT Filed: Feb. 6, 2017

(86) PCT No.: PCT/DE2017/100086
§ 371 (c)(1),
(2) Date: Aug. 16, 2018

(87) PCT Pub. No.: WO2017/140297
PCT Pub. Date: Aug. 24, 2017

(65) Prior Publication Data
US 2019/0032488 A1 Jan. 31, 2019

(30) Foreign Application Priority Data
Feb. 16, 2016 (DE) ..................... 10 2016 102 650.8

(51) Int. Cl.
*F01B 9/02* (2006.01)
*F16J 15/00* (2006.01)
(Continued)

(52) U.S. Cl.
CPC .............. *F01B 9/026* (2013.01); *F01B 17/04* (2013.01); *F01K 3/00* (2013.01); *F01K 7/00* (2013.01);
(Continued)

(58) Field of Classification Search
CPC ...... F16C 5/00; F02G 1/0535; F02G 2253/03; F02G 1/02; F02G 2270/45;
(Continued)

(56) References Cited

U.S. PATENT DOCUMENTS 3,230,941 A * 1/1966 Hans .................. F16J 15/16
123/41.36
3,458,208 A * 7/1969 Jung .................. F16J 15/56
277/548
(Continued)

FOREIGN PATENT DOCUMENTS

CN 104747314 A 7/2015
DE 322765 C 7/1920
(Continued)

OTHER PUBLICATIONS

International Search Report dated Sep. 4, 2017 re: Application No. PCT/DE2017/100086, pp. 1-3, citing: US 3 320 941 A, DE 14 25 497 A1, DE 322 765 C, EP 1 978 230 A2 and DE 10 2007 060666 A1.

*Primary Examiner* — Mark A Laurenzi
*Assistant Examiner* — Xiaoting Hu
(74) *Attorney, Agent, or Firm* — Cantor Colburn LLP

(57) ABSTRACT

A heat engine, in particular an ORC engine, includes a crankcase and at least one working cylinder connected to the crankcase, in which cylinder a working piston that is rigidly connected to a piston rod can be moved and the end of the piston rod facing away from the working piston is articulatedly connected to a connecting rod by crosshead running in the longitudinal direction of the piston rod. The interior of the working cylinder, which is supplied with a working medium, is separated from the interior of the crankcase, which is supplied with oil, by two walls, each of which has a sealing through-opening for the piston rod.

9 Claims, 3 Drawing Sheets

(51) Int. Cl.
    *F02B 75/32*     (2006.01)
    *F16J 15/56*     (2006.01)
    *F01B 17/04*     (2006.01)
    *F01K 7/00*     (2006.01)
    *F01K 25/08*     (2006.01)
    *F02G 1/02*     (2006.01)
    *F03G 6/00*     (2006.01)
    *F02F 11/00*     (2006.01)
    *F01K 3/00*     (2006.01)

(52) U.S. Cl.
    CPC .............. *F01K 25/08* (2013.01); *F02B 75/32* (2013.01); *F02F 11/00* (2013.01); *F02G 1/02* (2013.01); *F03G 6/003* (2013.01); *F16J 15/00* (2013.01); *F16J 15/56* (2013.01); *Y02E 10/46* (2013.01)

(58) Field of Classification Search
    CPC ...... F16J 15/00–56; F16J 15/008; F16J 15/16; F01K 25/08–10; F01K 7/00; F01K 25/10; F01K 3/00; F01B 17/04; F01B 9/026; F01B 9/02; F01B 1/12; F04B 39/041; F02F 11/00; F02B 75/32
    See application file for complete search history.

(56) References Cited

U.S. PATENT DOCUMENTS 4,257,230 A * 3/1981 Lundholm ............ F02G 1/0535
    60/517
4,469,017 A * 9/1984 Hanlon .................. F16J 15/008
    277/558
2016/0369792 A1* 12/2016 Wagner .................. F04B 53/22

FOREIGN PATENT DOCUMENTS

| | | |
|---|---|---|
| DE | 1425497 A1 | 12/1968 |
| DE | 4100256 A1 | 7/1992 |
| DE | 102007060666 A1 | 6/2009 |
| EP | 1978230 A2 | 10/2008 |
| GB | 1110210 A | 4/1968 |

* cited by examiner

HEAT ENGINE, IN PARTICULAR ORC ENGINE

TECHNICAL FIELD

The disclosure relates to a heat engine, in particular an ORC engine, having a crankcase and at least one working cylinder connected to the crankcase, in which cylinder a working piston which is rigidly connected to a piston rod can be moved and the end of the piston rod remote from the working piston is articulated to a connecting rod by means of a crosshead guided in the longitudinal direction of the piston rod.

BACKGROUND

Heat engines, in particular ORC engines, of this type are known from practice, in particular those which build on conventional internal combustion engines, the cylinder bushings of which are used to guide the crosshead which can be articulated to the connecting rod.

SUMMARY

The present disclosure relates to creating a novel heat engine of the type mentioned in the introduction, which can be operated in a reliable and low-maintenance manner in the long term while keeping lubricating oil consumption low.

The heat engine according to the disclosure is characterised in that the inner chamber (B) of the working cylinder which is loaded with a working medium is separated from the inner chamber (A) of the crankcase which is loaded with oil, by two walls, each of which has a sealed through-opening for the piston rod.

Advantageously, the two separating walls according to the disclosure, each with a sealed through-opening for the piston rod, can reliably prevent a closed circuit for the working medium, e.g. ethanol vapour, being contaminated by lubricating oil and replacement of the working medium becoming necessary after a short operating time.

In a preferred embodiment of the disclosure, when the working piston is at top dead centre, the section of the piston rod which is wetted with oil at the bottom dead centre of the working piston only reaches at most the through-opening which faces the inner chamber (B) which is loaded with the working medium. Oil residues which are brought out of the crankcase together with the wetted piston rod despite sealing of the other through-opening do not then reach the through-opening in the working cylinder, and therefore there is no risk of the oil passing through and the working medium being contaminated.

In one embodiment, a chamber (C) with an opening for inspection and installation purposes is formed between the two walls separating the said inner chambers (A,B).

In a further preferred embodiment of the disclosure, the piston rod has an annular barrier which is arranged in the chamber (C) between the separating walls to catch any oil creeping along the piston rod.

This annular barrier can itself be sealed off against the piston rod and have in particular breakaway edges for oil.

As a measure for preventing oil escaping from the crankcase in spite of sealing of the relevant through-opening, it can also be provided for the crosshead to have, on its side facing the through-opening, such a shape that, when the piston moves to the top dead centre, no oil is thrown towards the through-opening by the crosshead, and instead oil can flow away from the crosshead, among other things, in the opposite direction. The surface of the crosshead facing the relevant through-opening preferably has a conical shape.

The through-opening which faces the inner chamber (B) which is loaded by the working medium preferably has a seal which is also effective when the heat engine is at a standstill. Advantageously, this standstill seal can be combined with a seal which does not seal the through-opening until the heat engine has heated up to operating temperature, while the standstill seal loses more and more of its sealing effect during heating up to operating temperature.

The standstill seal can have an annular sealing element with a thermal expansion which is greater than the thermal expansion of the piston rod so that a sealing lip of the annular seal lifts off from the piston rod at operating temperature.

In a further embodiment of the disclosure, a bucket tappet of an outlet valve of the working cylinder is sealed off against a guide bushing of the bucket tappet and thus the working chamber (B) of the working piston is sealed off from an inner chamber (D) of a cylinder head assembly. The cylinder head assembly can also have such a low-friction design that it can be operated without lubricating oil.

BRIEF DESCRIPTION OF THE DRAWINGS

The disclosure is explained in more detail below using an exemplary embodiment and the attached drawings relating to this exemplary embodiment. In the figures.

DETAILED DESCRIPTION OF THE DRAWINGS

Figure 1:
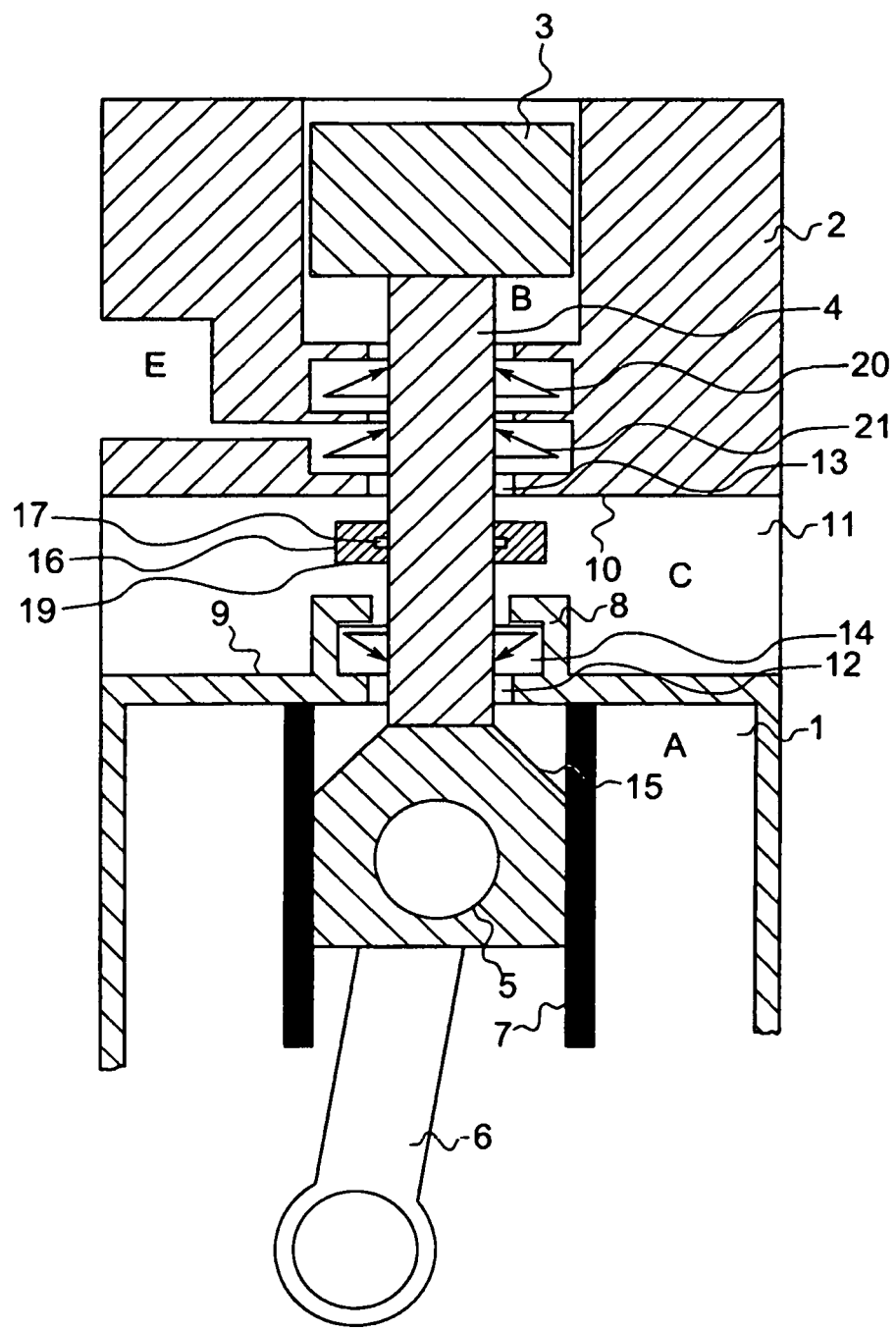
FIG. 1 shows an ORC engine according to the disclosure in a cut-away side view.

An ORC engine comprises a crankcase 1 and a working cylinder 2 connected to the crankcase 1. In the working cylinder 2 can be moved a working piston 3 which is connected rigidly to a piston rod 4. At its end remote from the working piston 3, the piston rod 4 is articulated to a connecting rod 6 via a crosshead 5.

The crosshead 5 moves in a bushing 7 formed in the crankcase 1 and is guided inside the bushing 7 in the longitudinal direction of the piston rod 4 by guide rails (not shown).

In the example shown, the working cylinder 2 coaxial to the bushing 7 is connected to the crankcase 1 via an intermediate housing which has housing walls 9 and 10 and an opening 11. The housing wall 9 terminates the inner chamber A of the crankcase 1 which is loaded with oil. The housing wall 10 closes a chamber B of the working cylinder 2 into which a working medium, e.g. ethanol vapour, passes. Both walls 9, 10 have a sealed through-opening 12 and 13, respectively, for the piston rod 4.

In the through-opening 12 in the housing wall 9 there is an annular seal 14 made of plastic, e.g. PTFE, or of bronze, which largely prevents oil escaping from the crankcase 1. A conical surface 15 of the crosshead 5 which faces the through-opening 12 ensures from the start that the amount of oil which is thrown towards the through-opening 12 by the crosshead when the working piston 3 moves is low, in that the oil can run outwards and in the opposite direction from the conical surface 15.

The annular seal 14 is held in a removable attachment 8 on the housing wall 9.

Inside the chamber C formed between the housing walls 9 and 10 there is arranged on the piston rod 4 an annular barrier 16 which holds back any residual amounts, escaping from the inner chamber of the crankcase 1, of the oil which creeps along the piston rod 4 despite sealing by the annular seal 14. As can be seen in FIG. 1, the annular barrier 16 itself is sealed off against the piston rod 4 by an annular seal 17, and a part of the annular barrier 16 which faces the through-opening 12 has multiple concentric oil breakaway edges at 19.

Figure 2:
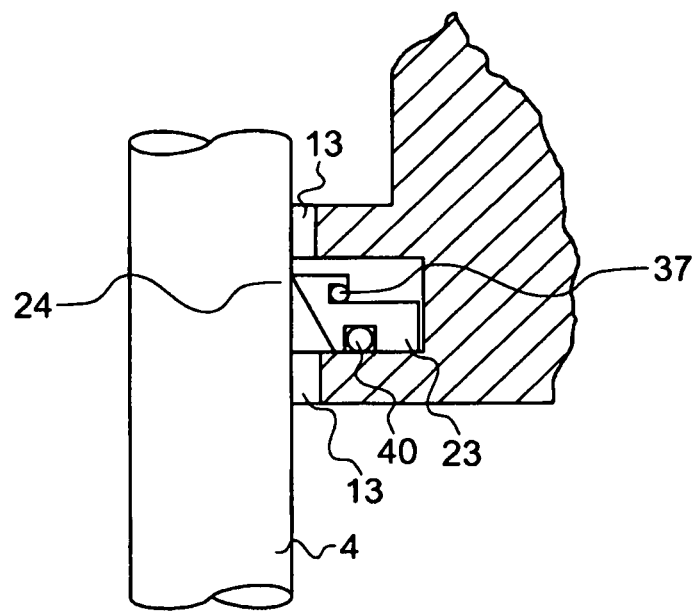
FIG. 2 shows a standstill seal used in the ORC engine of FIG. 1.

For the gas-tight sealing of the through-opening 13 in the housing wall 10, an annular seal 20 is used, which is combined with a standstill seal 21 which is effective when the ORC engine is at a standstill and is shown separately in FIG. 2. To ensure that no ethanol flows past the standstill seal, the space between the annular seal 20 and the standstill seal 21 is connected to a chamber E. The pressure level of the chamber E is below the pressure level of the chambers A, B and C.

In contrast to the arrangement shown, the seals 20, 21 could be accommodated in a cup-shaped attachment which forms a bulge in the housing wall 10 and can be removed separately from the rest of the housing wall 10, where applicable via the chamber B. The entire seal packing 20, 21 could also be removable through the chamber B.

In the starting state of the ORC engine, when the operating temperature has not yet been reached, the standstill seal ensures sealing of the through-opening 13, which is assumed by the annular seal 20 after the operating temperature has been reached.

As can be seen in FIG. 2, the standstill seal 21 comprises an annular sealing element 23 made of PTFE and having a sealing lip 24 which bears sealingly against the piston rod 4 in the cold state of the ORC engine, the contact pressure of the sealing lip 24 against the piston rod 4 being increased by an annular spring 37. An annular sealing element 40 made of silicone is used for further gas-tight sealing.

During start-up operation of the ORC engine, the material of the sealing element 23, which has a much higher coefficient of thermal expansion than the material of the piston rod 4, is heated by friction, among other things. The sealing lip 24 is lifted off the piston rod 4 thereby. On heating up, the likewise multi-part annular seal 20 increasingly assumes the sealing of the through-opening 13. Advantageously, the standstill seal 21 is not subject to any wear during operation.

Figure 3:
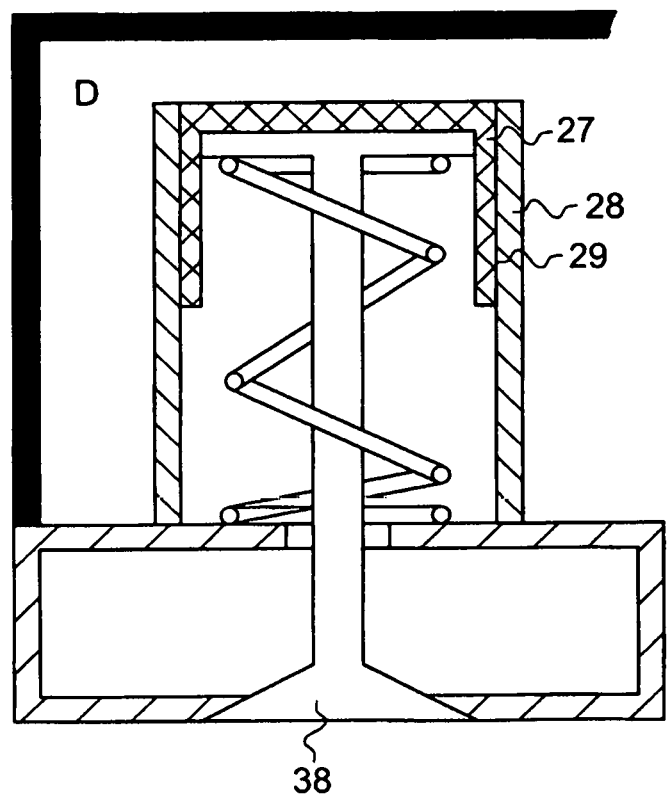
FIGS. 3 and 4 show parts of a cylinder head assembly of the ORC engine of FIG. 1 in a cut-away side view.

An outlet valve, shown in FIG. 3, in a cylinder head assembly (not shown in FIG. 1) of the working cylinder 2 comprises a valve disc 38 and a bucket tappet 27 which is coaxial to the valve disc 38 and is guided in a guide bushing 28. A sliding inlay 29 in the guide bushing 28 provides, in addition to guiding the bucket tappet 27, the sealing thereof against the guide bushing 28. The inner chamber B of the working cylinder 2 is thereby sealed off from the inner chamber D of the cylinder head assembly.

To prevent oil passing out of the cylinder head assembly into the working chamber B of the working cylinder 2 completely, oil lubrication of the cylinder head assembly shown in FIG. 3 can be omitted.

Figure 4:
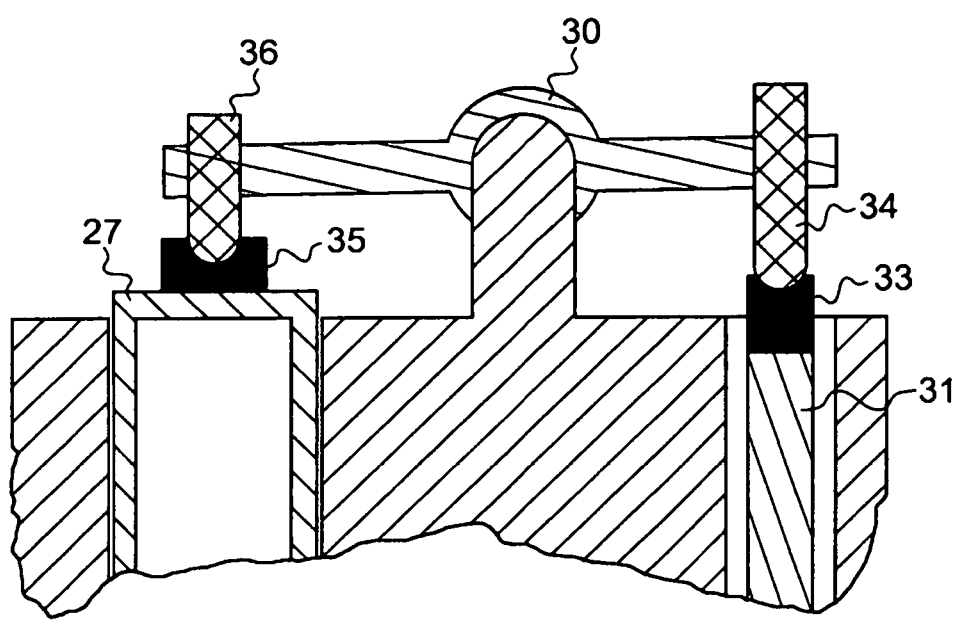

As is clear from FIG. 4, the cylinder head assembly which can be operated without oil lubrication comprises a rocker arm 30 which is actuated by a tappet rod 31 and operates the bucket tappet 27. A multi-part ball socket which comprises a ball socket insert 33 is fastened to the tappet rod 31. A ball stud 34 which is included in the rocker arm 30 engages in the ball socket. The bucket tappet 27 is operated via a sliding block 35 which is connected to the rocker arm 30 via a further ball stud 36. The fact that the sliding block 35 can be displaced perpendicular to the movement direction of the tappet rod 27 allows the transmission of the rotary movement of the rocker arm 30 to the linear movement of the bucket tappet 27.

The shape of the bucket tappet 27 protects internal components from abrasion, occurring during operation, from the sliding block 35 arranged over the bucket tappet 27.

The invention claimed is:

1. A heat engine having a crankcase and at least one working cylinder connected to the crankcase, in which cylinder a working piston rigidly connected to a piston rod is configured to move and the end of the piston rod remote from the working piston is articulated to a connecting rod by means of a crosshead guided in the longitudinal direction of the piston rod,
   wherein an inner chamber of the working cylinder is loaded with a working medium and separated from an inner chamber of the crankcase which is loaded with oil, by two walls, each wall having a sealed through-opening for the piston rod,
   wherein a single chamber with an accessible opening configured for inspection and installation is formed between the walls separating the inner chambers,
   wherein the piston rod has an annular barrier arranged in the single chamber, for oil creeping along the piston rod.

2. The heat engine according to claim 1,
   wherein
   when the working piston is at top dead centre, the section of the piston rod wetted with oil at the bottom dead centre of the working piston reaches at most the through-opening facing the inner chamber loaded with the working medium.

3. The heat engine according to claim 1, wherein the annular barrier has oil breakaway edges.

4. The heat engine according to claim 1,
   wherein
   the through-opening which faces the inner chamber which is loaded with the working medium is sealed off by a seal having a standstill seal.

5. The heat engine according to claim 4,
   wherein
   the standstill seal comprises an expanding, annular sealing element, the sealing effect of which ceases at the operating temperature of the heat engine.

6. The heat engine according to claim 4, wherein the seal comprising the standstill seal is connected to a chamber having a pressure level below a pressure level of a plurality of chambers (A), (B), and (C), wherein chamber (A) is the inner chamber of the crankcase, chamber (B) is the inner chamber of the working cylinder, and chamber (C) is the single chamber with the accessible opening formed between the walls separating the inner chambers.

7. The heat engine according to claim 1,
   wherein
   the crosshead has a conical surface.

8. The heat engine according to claim 1,
   wherein
   the heat engine comprises a cylinder head assembly without oil lubrication.

9. The heat engine according to claim 1, wherein the annular barrier is sealed off against the piston rod by an annular seal.

* * * * *